(12) United States Patent
Simon

(10) Patent No.: US 7,489,983 B2
(45) Date of Patent: *Feb. 10, 2009

(54) CONTROL FOR AN I.S. MACHINE

(75) Inventor: Jonathan S. Simon, Pleasant Valley, CT (US)

(73) Assignee: Emhart Glass S.A. (CH)

( * ) Notice: Subject to any disclaimer, the term of this patent is extended or adjusted under 35 U.S.C. 154(b) by 327 days.

This patent is subject to a terminal disclaimer.

(21) Appl. No.: 11/202,993

(22) Filed: Aug. 12, 2005

(65) Prior Publication Data

US 2006/0090515 A1    May 4, 2006

Related U.S. Application Data

(63) Continuation-in-part of application No. 10/980,502, filed on Nov. 3, 2004, now abandoned.

(51) Int. Cl.
*C03B 9/41* (2006.01)

(52) U.S. Cl. .................... 700/158; 700/29; 700/32; 700/33; 700/157; 65/29.1; 65/29.11; 65/163; 65/261; 65/377

(58) Field of Classification Search ............. 700/29, 700/33, 100, 103, 157, 158, 159, 189, 197, 700/228, 229, 275, 299, 300; 198/430; 65/29.1, 65/29.11
See application file for complete search history.

(56) References Cited

U.S. PATENT DOCUMENTS

| | | | | |
|---|---|---|---|---|
| 3,248,916 A | * | 5/1966 | Kenyon et al. ............... 72/8.4 |
| RE29,188 E | * | 4/1977 | Croughwell ................. 65/163 |
| 4,108,623 A | * | 8/1978 | Cardenas-Franco .......... 65/163 |
| 4,338,116 A | * | 7/1982 | Huff et al. .................... 65/29.1 |
| 4,364,764 A | * | 12/1982 | Farkas et al. ................ 65/29.1 |
| 4,368,062 A | * | 1/1983 | Mapes et al. ............... 65/29.11 |
| 4,457,772 A | * | 7/1984 | Haynes et al. ............... 65/160 |
| 5,247,450 A | * | 9/1993 | Clark ........................ 700/158 |
| 5,345,389 A | * | 9/1994 | Calvin et al. ............... 700/158 |
| 5,353,229 A | * | 10/1994 | Tanaka ...................... 700/103 |
| 6,604,383 B2 | * | 8/2003 | Simon ........................ 65/158 |
| 6,705,120 B2 | * | 3/2004 | Simon ........................ 65/163 |
| 2002/0184918 A1 | * | 12/2002 | Simon ........................ 65/29.1 |

FOREIGN PATENT DOCUMENTS

GB    2375837    12/2004

* cited by examiner

*Primary Examiner*—Paul L Rodriguez
*Assistant Examiner*—Carlos Ortiz Rodriguez
(74) *Attorney, Agent, or Firm*—Reinhart Boerner Van Deuren s.c.

(57) ABSTRACT

A control for a glass forming machine is disclosed which receives as an input the event angles used to control the machines operation. These event angles, which define the time in a cycle when each event is turned on and off, are unwrapped to represent times in the glass forming process which takes more than two machine cycles to complete. A computerized model of the unwrapped cycle is defined and a control analyzes the computerized model as a constrained optimization problem to define an optimized schedule of event times and defines a plurality of intermediate event time schedules in an incremental application.

6 Claims, 9 Drawing Sheets

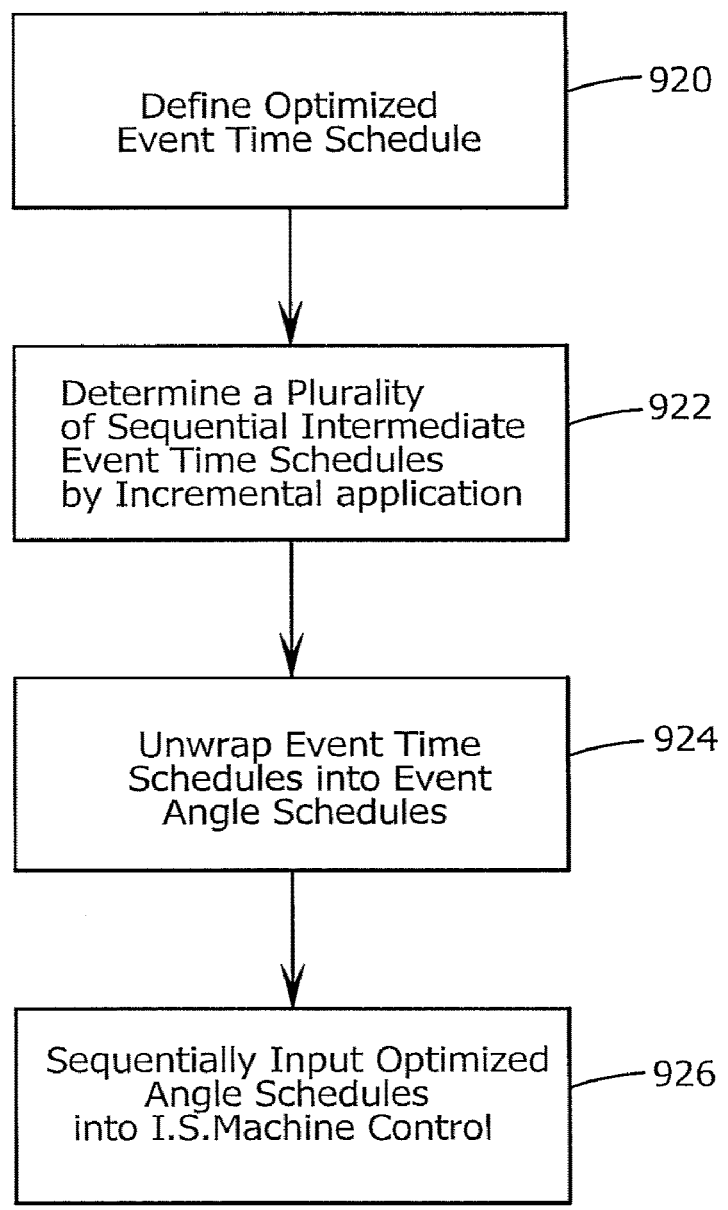

CONTROL FOR AN I.S. MACHINE

The present invention is a continuation-in-part of U.S. patent application Ser. No. 10/980,502, filed Nov. 3, 2004, now abandoned.

The present invention relates to an I.S. (individual section) machine and more specifically to a control for such a machine.

BACKGROUND OF THE INVENTION

An I. S. machine includes a plurality (usually 6, 8, 10, or 12) of sections. Each section has a blank station including a mold opening and closing mechanism having opposed mold supports which carry blank mold halves. The mold supports are displaced by a suitable motor such as a pneumatic cylinder or profiled actuator (servo motor) between open and closed positions. A gob of molten glass will be delivered to the closed blank mold. The open top of the blank mold will then be closed by a baffle, which is displaced from a remote position to an advanced position by a suitable motor. The gob will be formed into a parison in the blank mold and after the surface of the parison is sufficiently cooled, the baffle will be retracted, the mold supports will be retracted and a pair of neck ring holder arms, which are rotatively supported by an invert mechanism, will be rotated 180 degrees to displace the parison to a blow station. The blow station also includes a mold opening and closing mechanism having opposed mold supports carrying blow mold halves. These mold supports are displaced between open and closed positions by a suitable motor. With the parison located at the blow station, the mold supports are closed, the neck ring arms are opened to release the parison, the invert mechanism returns the neck ring arms to the blank side and a blow head support, is displaced from a retracted position to an advanced position, where a supported blow head closes the blow mold. The parison is blown into a bottle and when sufficiently cooled, the blow head is retracted, the blank molds are opened and a takeout mechanism is displaced to pick up the formed bottle and carry it to a location above a dead plate where it is cooled while suspended and then deposited onto the dead plate. In addition to the movement of mechanisms and devices, process air to pneumatic cylinders or to mold cooling systems may also be controlled.

Each section is controlled by a computer which operates under the control of a 360 degree timing drum (programmable sequencer) which defines a finite number of angular increments around the drum at which mechanisms, etc., can be turned on and off each 360 degrees of rotation. Each valve is cycled (turned on and off) and each mechanism is cycled within the time of one machine cycle at operator selected "event angles".

It is advantageous to operate an I.S. machine at the maximum possible cycle rate. The degree, to which this has been conventionally achieved, has been a function of the skill of the operator. Highly skilled operators have been able to run the same bottle, at a faster cycle rate than is possible with other operators.

To allow any company to operate the machine at a rate, that heretofore only the best operators could operate, a control for the IS machine was disclosed in U.S. Pat. Nos. 6,604,383, 6,604,384, 6,604,385, 6,604,386, 6,606,886, 6,705,119, 6,711,120, and 6,722,158. The teachings of these patents are incorporated herein by reference. In accordance with that control, a machine cycle is defined first by unwrapping the 360 event angle table into a constraint diagram. "Unwrapped" means the glass process cycle beginning with the formation of a gob of molten glass by severing the gob from a runner of molten glass and ending with the opening of the take out tongs when the formed bottle is located above the deadplate. This process cycle typically takes slightly more than two machine cycle periods. Then a mathematical representation of the unwrapped cycle constraint diagram is made that is capable of automated formulation and solution with the use of quadratic cost equations.

When an I.S. machine is controlled by servo controlled mechanisms, the limitation of interfering displacements or sequences between the glass and the mechanisms and between the mechanisms can be predicted with a fair degree of accuracy. In a conventional I.S. machine, which has mechanisms displaced with pneumatic motors, this predictability is far less accurate.

OBJECTS OF THE INVENTION

It is accordingly an object of the present invention to provide a control system for a glass forming machine of the type above discussed which can be easily applied to a conventional I.S. machine.

Other objects and advantages of the present invention will become apparent from the following portion of this specification and from the accompanying drawings, which illustrate a presently preferred embodiment incorporating the principles of the invention.

BRIEF DESCRIPTION OF THE DRAWINGS

FIG. 8 is a schematic block diagram illustrating the transition of the control for an I.S. machine from its existing cycle to an optimized cycle.

BRIEF DESCRIPTION OF THE PREFERRED EMBODIMENT

Figure 1:
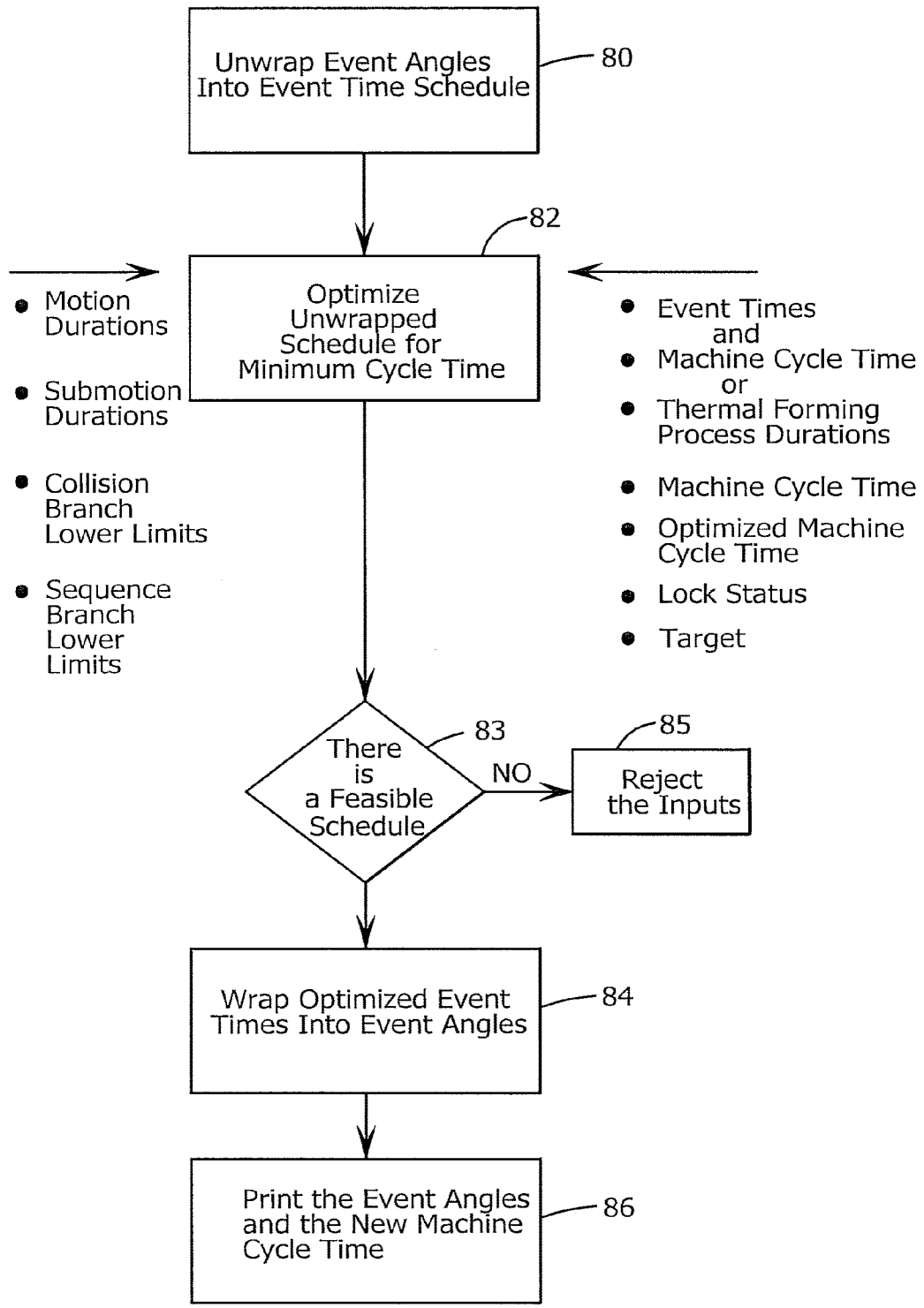
FIG. 1 is a flowchart illustrating the unwrapping of a 360 degree machine cycle in an I.S. machine into an event time schedule for a bottle producing cycle and the optimization of this schedule and its rewrapping into a 360 degree machine cycle.

FIG. 1 illustrates the use of the computerized model, as disclosed in the above patents, to define, for an existing machine set up, the optimized cycle time (Optimized Cycle Time) and the optimized Event Angles for that schedule. With Motion Durations, Sub-motion Durations, Collision Branch Lower Limits, Sequence Branch Lower Limits, Event Times, Machine Cycle Time, and Optimized Machine Cycle Time/Target/Lock Status known or as inputs to the Optimize Unwrapped Schedule For Minimum Cycle Time 82, the Computerized Model 64 will determine whether There Is A Feasible Schedule? 83. If not the model will Reject The Inputs 85. If there is a feasible schedule, the model will Wrap Optimized Event Times Into Event Angles 84 and Print The Event Angles And The New Machine Cycle Time 86 for the schedule cycle so that it will be available for input into the machine controller portion of the control ("Print" includes updating these event angles in the I.S. machine control). Where there is a sub-motion, a portion of the structure's displacement will be in possible interference with some other item and during this sub-motion a collision could result. Sequence branches deal with the reality that some events must happen before other events, such as the blank molds must close before the baffle can be moved to close the molds. Thermal forming times are times when heat is being removed from the glass or when some glass forming process, like blowing or pressing, etc., is taking place. For example, when a parison is blown into a bottle in the blow mold, heat will be transferred from the blown bottle at the mold surface until the blow mold is opened. When the operator locks the thermal forming times during an optimization process, the glass process will remain unchanged. "Target" indicates that a value has been introduced that the operator is hoping to achieve.

Figure 2:
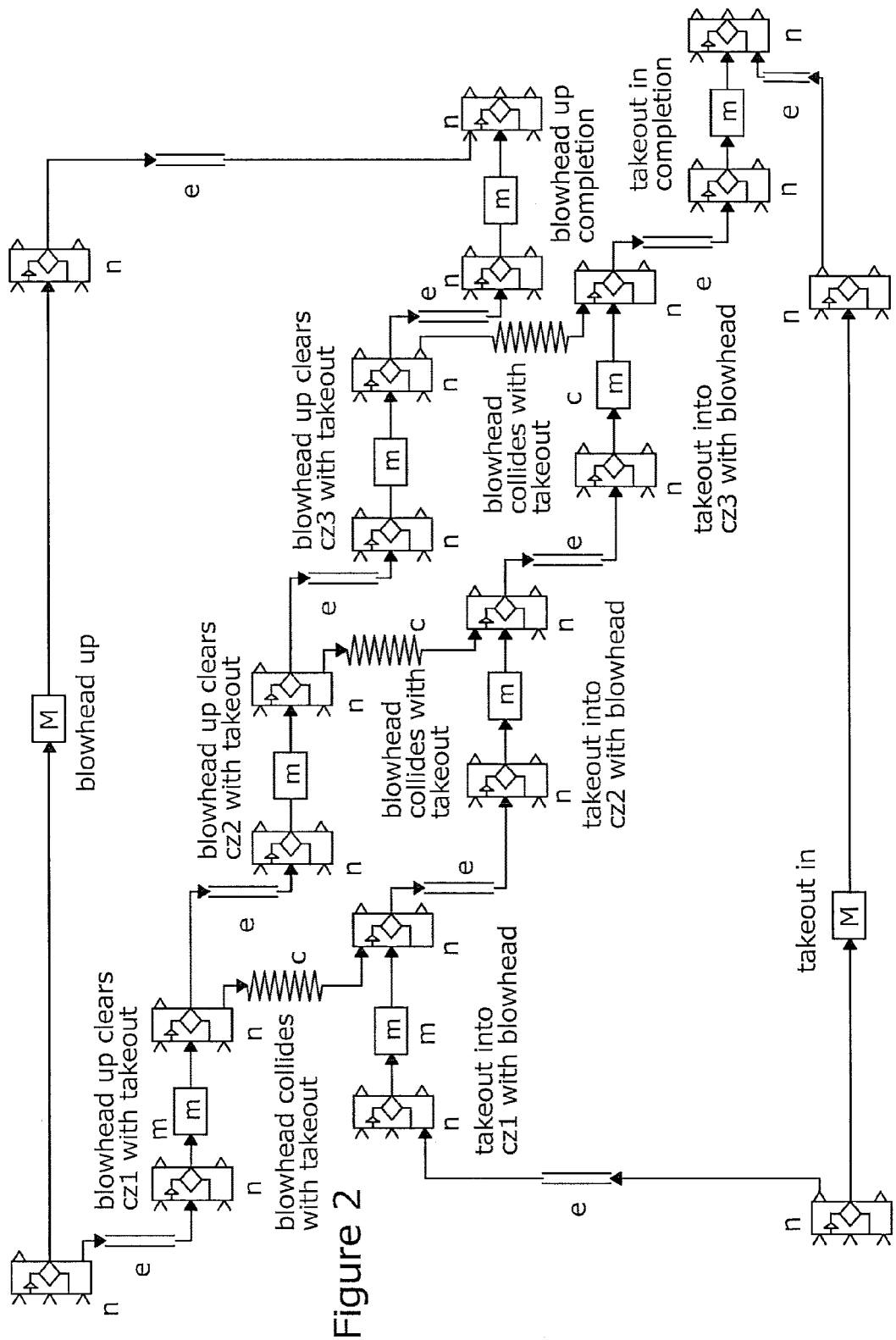
FIG. 2 is a portion of an unwrapped cycle constraint diagram for an I.S. machine wherein the two referenced mechanisms are servo operated.

FIG. 2 illustrates a portion of an unwrapped cycle constraint diagram for an I.S. machine in which servo motors operate the blowhead and takeout mechanisms. A complete discussion of this drawing is presented in the cited patents but for purposes of discussion here, "n" connotes a node, "e" connotes that two attached nodes are at the same time, "m" connotes a submotion, "M" connotes a complete motion, "cz" connotes a collision zone and "c" connotes that the two mechanisms collide. As illustrated there are three collision zones, each of which can result in a collision between these two mechanisms and the computerized model can take each into consideration in its analysis.

Figure 2A:
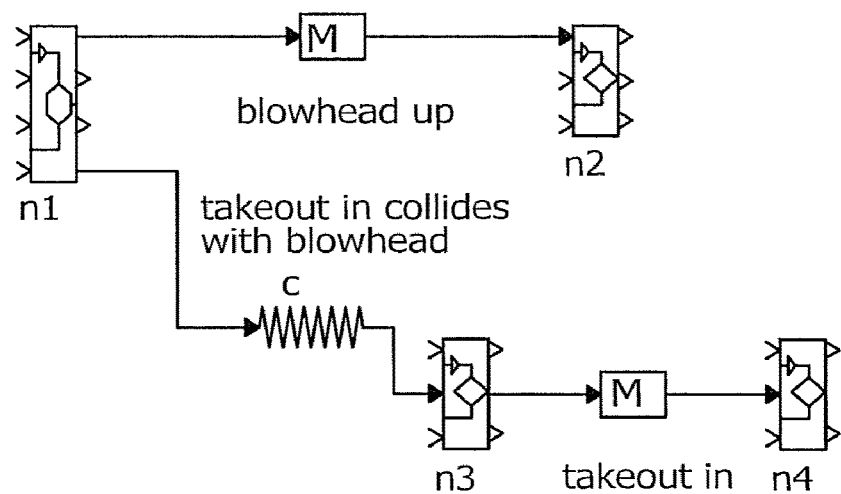
FIG. 2A is an alternate showing of the diagram illustrated in FIG. 2, wherein the two mechanisms are not servo operated.

In accordance with the present invention, the portions of this drawing which relate to potentially colliding mechanisms, where one or all of the mechanisms does not operate with a servo motor, are redrawn as "user collision branches". FIG. 2A illustrates a "user collision branch" which represents the situation where two potentially colliding mechanisms (the blowhead and the takeout) are not both operated with servomotors (here neither is operated with a servomotor). The fact that a collision can occur ("takeout in collides with blowhead") is illustrated in this user collision branch "c" which is connected between the start nodes (n1,n3) of the two motion branches. The collision branch could also be connected between the end nodes for these mechanisms. The drawing states that if "blowhead up" starts at n1 and concludes at some time n2 thereafter, and "takeout in" starts at n3 (a time latter than n1) and concludes at n4, there will not be a collision. These start times will be known from an existing event angle chart. FIG. 2A simply provides that if the takeout starts n3-n1 after n1, there will be no collision. This modification to the model will be made whenever a collision can occur between two mechanisms that are not both operated with servo motors. In a user collision branch, the minimum time between the start of the two mechanisms will be the time defined by reference to the current event angle chart. The user, can lower this lower limit should some time be available as judged by user observation.

Once the optimized schedule is determined, it is applied to the operating machine without disrupting the glass making process. To accomplish this, the event time schedule is modified in small increments from its current operation to the final optimized schedule in a process that will be referred to as "incremental application".

Figure 3:
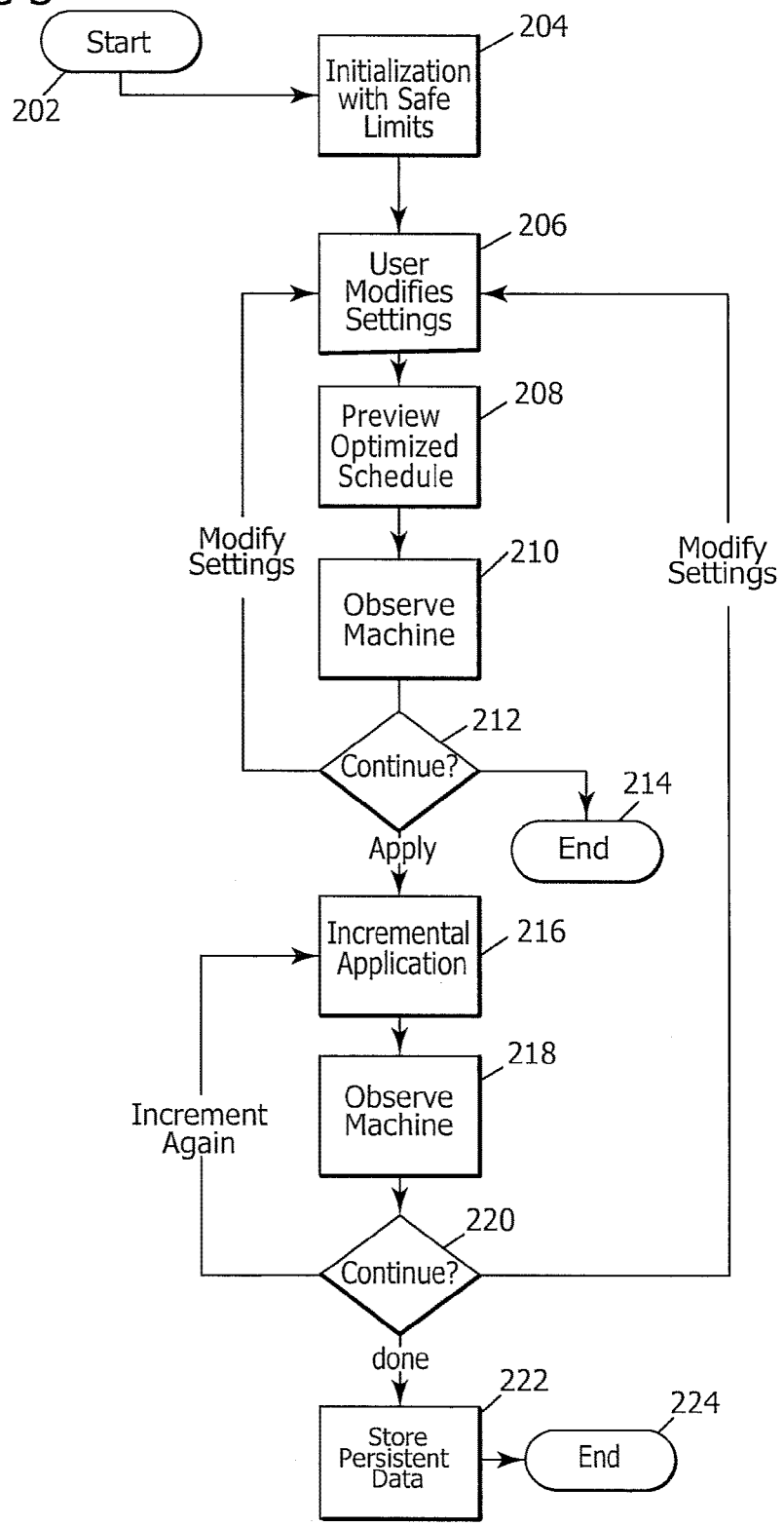
FIG. 3 is a flow chart of a high level overview of the process of incrementally applying an optimized schedule using augmented constraints.

A flowchart providing a high level overview of an optimization session is shown in FIG. 3. The session is initiated at 202. Limits are initialized by 204 such that the collision and sequence margins will not be any worse than they are with the current job timing. The user then modifies, as required, the current target and limit values for the network branches through the user interface 206. Using these settings, an optimization is performed and a preview of the optimal solution is provided to the user by 208. This preview includes the optimized duration of the network branches, as well as an indication of the active limits and how they should be adjusted to allow the optimal solution to be closer to the target values. The user then observes the operation of the machine 210 and assesses whether the suggested adjustments to the active limits are acceptable. (e.g. is a particular pair of mechanisms truly on the verge of colliding or is there remaining margin?) Based upon the previewed results, and users observations, the user can elect through decision block 212 to make further modifications to the optimization settings by returning to 206, discontinue the session and not change the event timings 214, or to continue and apply the changes. If the user continues, the timing of the machine will be moved incrementally from its current state to the optimized timing by 216. Each execution of 216 changes the event angles by at most, some prespecified maximum increment. After each such incremental change, the user observes the operation of the machine 218 to verify that there are no imminent collisions, sequencing problems or undesirable affects to the ware formation. Based upon this observation, the user can elect through decision block 220 to make the next incremental change by returning to 216, make further modifications to the optimization settings 206, or discontinue the optimization process. If the user discontinues the optimization process, the settings (persistent data) are stored at the user's option by 222 and the session is ended 224.

In general, the event angles on all sections must be modified when optimizing the machine speed. This is because all sections must operate at the same speed and the optimal event timing for each section depends upon the machine speed. The maximum achievable speed of the machine is limited, by the maximum achievable speed of the slowest section. All of the sections will be optimized to run at the maximum achievable speed of the slowest section.

Figure 7:
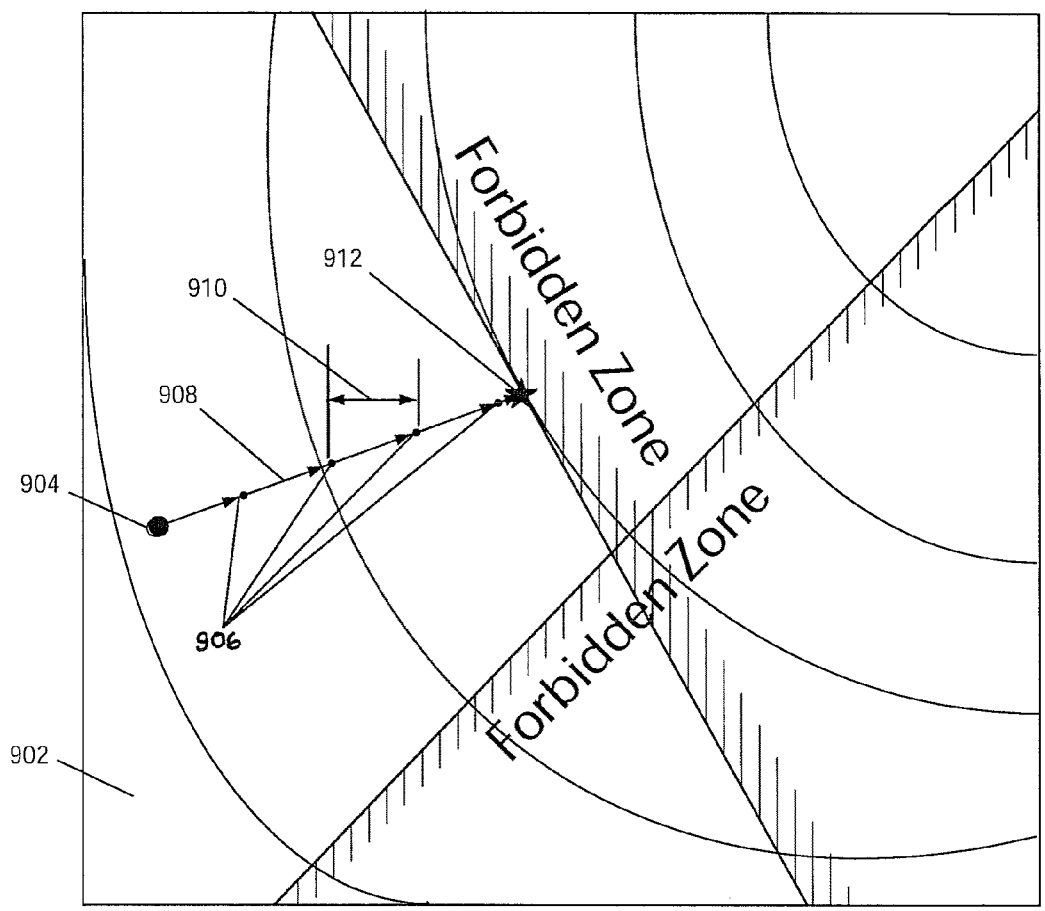
FIG. 7 is a geometric interpretation of incrementally applying an optimized schedule using interpolation.

Two variants of the process of incrementally applying an optimized schedule are detailed in FIGS. 4 through 7. The use of augmented constraints is flow charted in FIG. 4 and a geometric interpretation of this approach is provided in FIG. 5. An alternative approach, based upon interpolation, is flow charted in FIG. 6, and a geometric interpretation of this approach is shown in FIG. 7.

Figure 4:
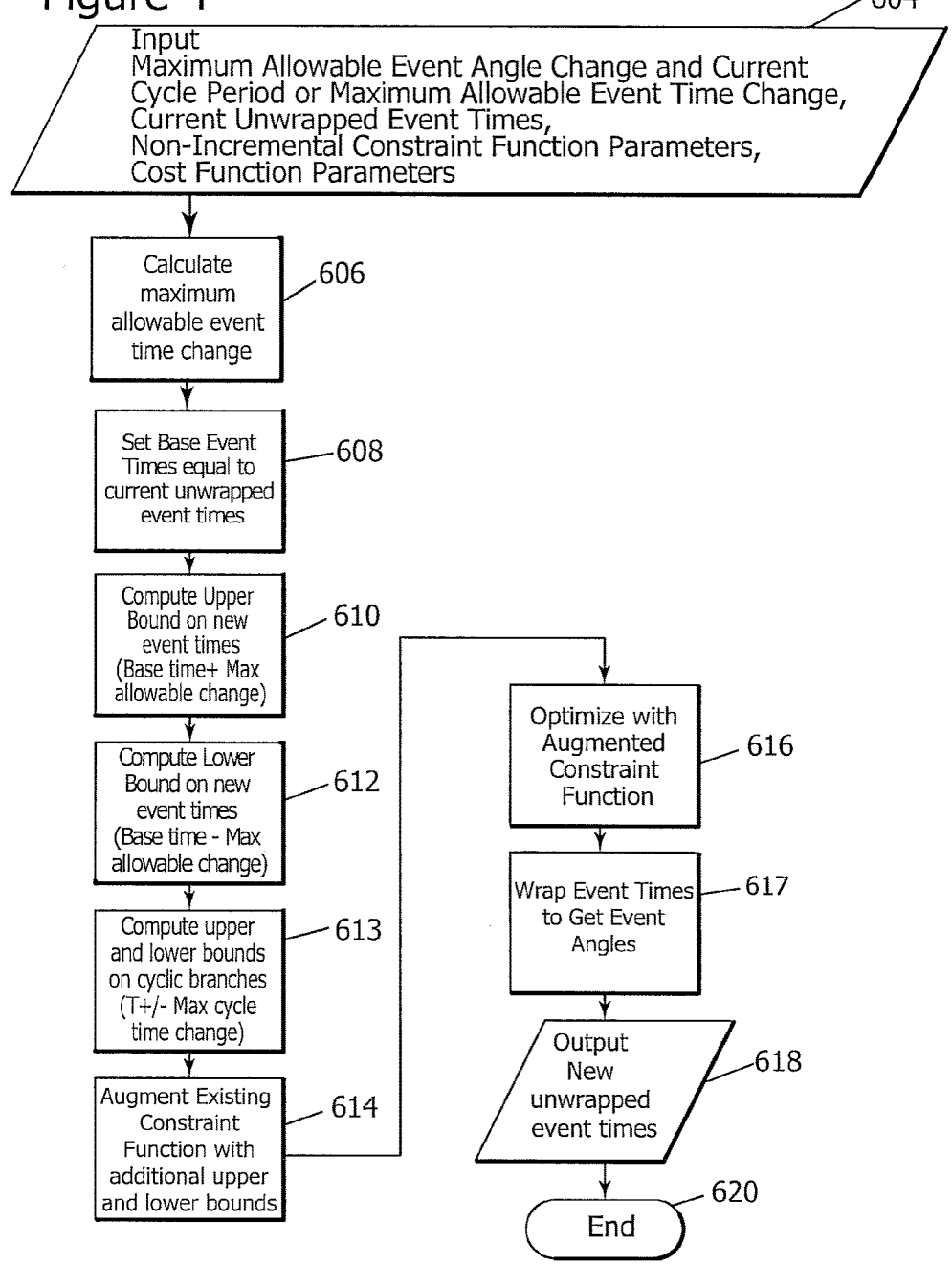
FIG. 4 is a flow chart of the process of incrementally applying an optimized schedule using augmented constraints.

Incremental Application using augmented constraints is one approach to create intermediate schedules of events and their associated cycle times (FIG. 4). In the augmented constraint approach, a constrained optimization problem is repeatedly solved with an augmented version of the original constraint function. Specifically, the constraint function of the original (preview) optimization is augmented with additional constraints that limit the maximum amount that each unwrapped event time can change from its current value. This process is detailed in the flowchart shown in FIG. 6. The process begins with input 604 of the parameters of the original, non-incremental, constraint function, and cost functions, maximum allowable change in any event angle or maximum allowable change in any event time, maximum allowable change in cycle period, current cycle period, current unwrapped event times. If it is not provided as an input, the maximum allowable change in any event time is calculated by 606 using:

$$\delta t = \begin{array}{ll} \frac{\delta \theta}{360}(T - \delta T) & \text{speedup} \\ \frac{\delta \theta}{360} T & \text{slowdown} \end{array}$$

where:

$\delta t$=magnitude of maximum allowable change in any event time $\delta \theta$=magnitude of maximum allowable change in any event angle T=cycle period $\delta \delta$=magnitude of maximum allowable change in cycle period Since the change in an event time for a given change in event angle depends upon the cycle period, the above formula selects the more limiting value. This will be conservative for any intermediate value of the actual cycle time change.

The base event times are defined to be equal to the current event times by 608. An upper bound on new event times is set by 610 by adding the maximum allowable event time to the base time. Similarly, the lower bound is computed by 612 by subtracting the maximum allowable change from the base times. In 613 upper bounds on the cyclic branch durations are computed by adding and the maximum allowable change in cycle period to the current cycle period and lower bounds are computed by subtracting the maximum allowable change in cycle period from the current cycle period. The existing constraint function is augmented with these upper and lower bounds on admissible event times and cyclic branch durations by 614. A constrained optimization using the original cost function and augmented constraint function is performed by 616. The resulting new unwrapped event times are then wrapped around a 360 drum by 617 to produce a new set of event angles. The new event angles are output by 618. The process completes at 620 awaiting another request by the user to further increment toward the final optimized schedule or terminates when the non-incremental solution is reached.

Figure 5:
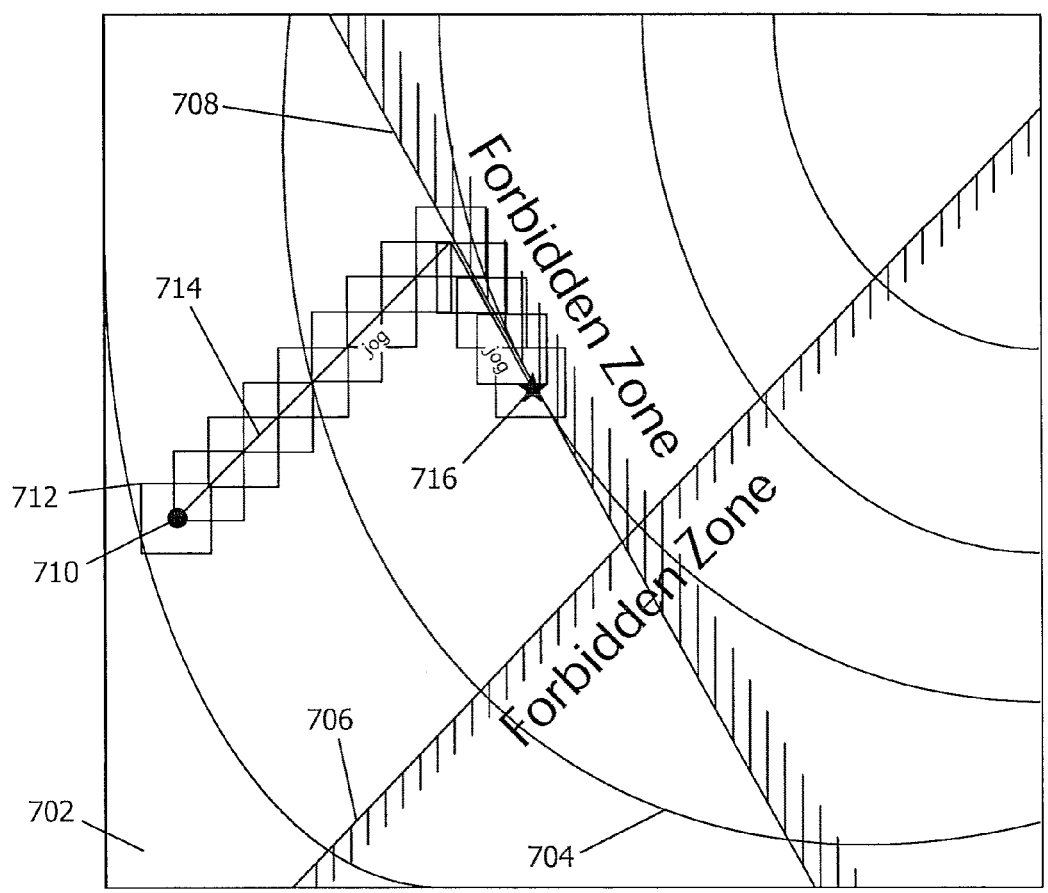
FIG. 5 is a geometric interpretation of the process of incrementally applying an optimized schedule using augmented constraints.
Figure 6:
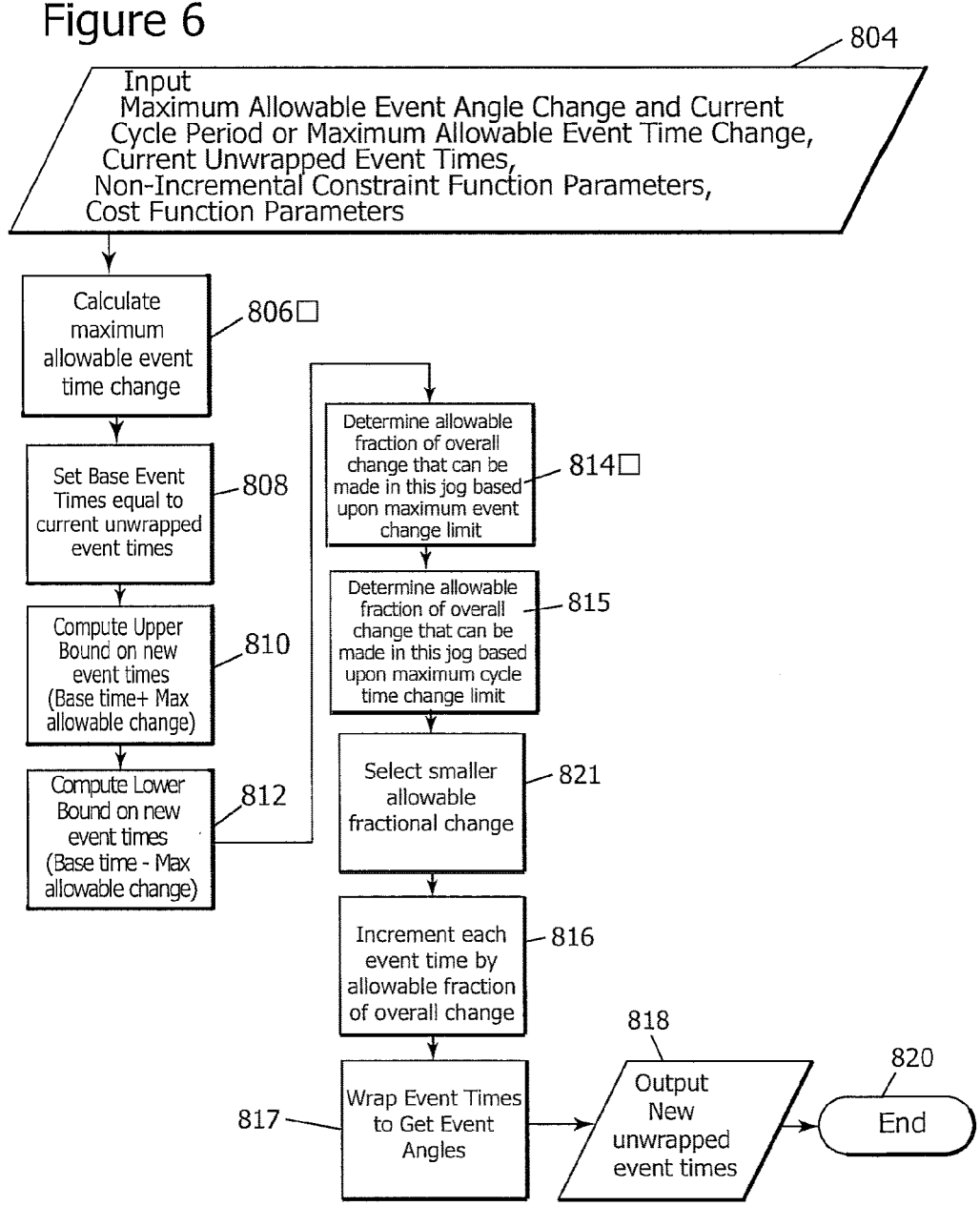
FIG. 6 is a flow chart of the process of incrementally applying an optimized schedule using interpolation.

This approach can be further understood by considering a geometric interpretation. In general, a schedule consisting of N event unwrapped event times can be considered as a single point in an N dimensional space. This is illustrated in FIG. 5 for a schedule that has only two event times. Any particular schedule is plotted as a point in the two dimensional plane 702 whose horizontal coordinate represents the event time for one event in the schedule, and vertical coordinate represents the second event in the schedule. On this plane we show level lines 704 of the cost function and constraint boundaries 706 and 708 for the original problem. The incremental application process begins at some starting schedule 710, which becomes the base time for the first application. The additional augmented constraints on the maximum allowable change can be visualized as the box 712 surrounding the base point 710. This augmented, constrained optimization problem is solved yielding the next schedule 718, which is at one of the augmented constraint boundaries. This becomes the new base point and the process is repeated following a path 714 until the final schedule 716 is reached.

In the interpolation approach, we find new schedules by interpolating between the initial and final (preview) schedules. This process is detailed in the flowchart shown in FIG. 6. The process begins with input 804 of the current unwrapped event times, final optimized unwrapped event times, maximum allowable change in any event angle or maximum allowable change in any event time, maximum allowable change in cycle period and current cycle period. If it is not provided as an input, the maximum allowable change in any event time is calculated by 806 using:

$$\delta t = \begin{array}{ll} \frac{\delta \theta}{360}(T - \delta T) & \text{speedup} \\ \frac{\delta \theta}{360} T & \text{slowdown} \end{array}$$

where:

$\delta t$=magnitude of maximum allowable change in any event time $\delta \theta$=magnitude of maximum allowable change in any event angle T=cycle period $\delta \delta$=magnitude of maximum allowable change in cycle period Since the change in an event time for a given change in event angle depends upon the cycle period the above formula selects the more limiting value. This will be conservative for any intermediate value of the actual cycle time change.

The base event times are defined to be equal to the current event times by 808. The change in each individual event time from its current value to its final optimized value is computed by 810. The event time with greatest magnitude change is determined by 812. The fraction of the overall change which can be made without changing this most sensitive event time by more than the allowable limit is calculated by 814. The allowable fraction of the overall change that can be made without changing the cycle period by more than the maximum allowed limit is calculated by 815. The smaller of the fractions calculated by 814 and 815 is selected by 821. A new schedule is then calculated by 816 by incrementing the individual base event times by the product of the fraction computed by 821 and the overall change in the individual event time computed by 810. The resulting unwrapped event time schedule is wrapped around a 360 drum by 817 to produce a new event angle schedule. The new event angles are output by 818. The process completes at 820 awaiting another request by the user to further increment toward the final optimized schedule or terminates when the non-incremental solution is reached.

This approach can be further understood by considering the geometric interpretation illustrated in FIG. 7 for a simple two-dimensional (schedule with two event times) case. As discussed previously in reference to FIG. 5, any particular schedule can then plotted as a point in a two dimensional plane 902. New schedule points 906 are interpolated along the line 908 connecting the initial schedule 904 and 912. Schedule points are spaced along the line so as not to exceed the maximum allowable per step change in any event time 910. In this example, this would be dictated by the change in the horizontal coordinate because a given movement along the line 908 will produce a greater change in the horizontal than in the vertical coordinate. (This assumes that the limiting factor is the maximum allowable change in event angles. If the limiting factor were the maximum allowable change in speed, the distance 910 would be further reduced).

It is noted that the current cycle period is determined by the duration of any cyclic branch in the network model. Thus the cycle time is implicit in the N dimensional representation of the schedule vector. Also, as an alternative to supplying the incremental optimization routine with the current cycle period, it could be obtained from the current unwrapped event times, and the indices associated with the ends of a cyclic branch.

FIG. 8 shows the incremental application procedure. An operator will Define Optimized Event Time Schedule 920. The operator will then Determine A Plurality of Sequential Intermediate Event Time Schedules by Incremental Application 922. The operator will then Unwrap Event Time Schedules Into Event Angle Schedules 924 and Sequentially Input Event Angle Schedules Into I.S. Machine Control.

What is claimed is:

1. A control system for a glass forming machine which includes a number of displaceable mechanisms and processes which are operated at discrete times within a machine cycle, wherein an event angle table defines the times in a machine cycle when each mechanism or process is operated, wherein the glass forming machine will transform a gob of molten glass into a bottle in a glass process that takes more than two machine cycles to complete, and wherein the machine cycle event angles are unwrapped into glass process event times of an initial schedule of the complete machine cycle and presented as a computerized model, the control system comprising:

a computer configured to analyze the computerized model as a constrained optimization problem to determine an optimized schedule of process event times, and to determine a plurality of sequential intermediate schedules of the process event times, wherein a gradual transition of the control system from the initial schedule of the complete machine cycle to the optimized schedule of the complete machine cycle is determined, and wherein the glass forming machine is controlled based on the optimized schedule.

2. The control system for a glass forming machine according to claim 1, wherein said intermediate schedules of process event times are determined by linear interpolation.

3. The control system for a glass forming machine according to claim 1, wherein each of said intermediate schedules of process event times are determined by analyzing the computerized model as a constrained optimization problem.

4. The control system for a glass forming machine according to claim 3, including an upper bound for new process event times defined by adding a maximum allowable change in any select event in the original schedule of the complete machine cycle, and a lower bound defined by subtracting the maximum allowable change of the selected event in the original schedule of the complete machine cycle, wherein an existing event time is augmented with the upper and lower bounds on admissible event times resulting in a new unwrapped event time for the selected event.

5. The control system for a glass forming machine according to claim 2, including a current unwrapped event time, a final optimized unwrapped event time, maximum allowable change in any event time, maximum allowable change in machine cycle period and current machine cycle time, wherein an allowable fraction of an overall change that can be made without changing the cycle period by more than a maximum allowed limit is determined and a new schedule is determined by incrementing individual base event times by the product of the allowable fraction of the overall change and the change from the current unwrapped event time and the final optimized unwrapped event time.

6. The control system for a glass forming machine according to claim 1, including an operator terminal coupled to the computer.

* * * * *